US012457220B2

(12) United States Patent
Batni

(10) Patent No.: US 12,457,220 B2
(45) Date of Patent: *Oct. 28, 2025

(54) POLICY-BASED PROCESSING OF AUTHENTICATION REQUESTS USING LOCATION DATA FOR CLOUD-HOSTED SYSTEMS AND APPLICATIONS

(71) Applicant: NVIDIA Corporation, Santa Clara, CA (US)

(72) Inventor: Dhruva Lakshmana Rao Batni, Bothell, WA (US)

(73) Assignee: NVIDIA Corporation, Santa Clara, CA (US)

( * ) Notice: Subject to any disclaimer, the term of this patent is extended or adjusted under 35 U.S.C. 154(b) by 127 days.

This patent is subject to a terminal disclaimer.

(21) Appl. No.: 18/085,226

(22) Filed: Dec. 20, 2022

(65) Prior Publication Data

US 2024/0205235 A1 Jun. 20, 2024

(51) Int. Cl.
*H04L 9/40* (2022.01)
*H04W 12/08* (2021.01)

(52) U.S. Cl.
CPC ........... *H04L 63/107* (2013.01); *H04W 12/08* (2013.01)

(58) Field of Classification Search
CPC ..... H04L 63/107; H04L 63/105; H04W 12/08
See application file for complete search history.

(56) References Cited

U.S. PATENT DOCUMENTS

| | | | | |
|---|---|---|---|---|
| 6,460,141 B1* | 10/2002 | Olden | ..................... | H04L 63/20 726/13 |
| 2008/0057906 A1* | 3/2008 | Lee | ..................... | H04L 63/0892 455/411 |
| 2010/0296441 A1* | 11/2010 | Barkan | .................. | H04W 88/04 370/328 |
| 2011/0206012 A1* | 8/2011 | Youn | ............... | H04W 36/00698 370/332 |
| 2016/0029279 A1* | 1/2016 | Bellamkonda | .... | H04W 36/0079 455/436 |
| 2022/0286480 A1* | 9/2022 | Jadhav | .................... | H04L 63/20 |

* cited by examiner

*Primary Examiner* — Hany S. Gadalla
(74) *Attorney, Agent, or Firm* — Lowenstein Sandler LLP

(57) ABSTRACT

Disclosed are apparatuses, systems, and techniques that improve efficiency and decrease latency of processing of authorization requests by cloud-based access servers that evaluate access rights to access various cloud-based services. The techniques include but are not limited to using location tracking data to predict that a user is to move from an area served by a first access point of the cloud-based services to an area served by a second access point of the cloud-based services. The techniques further include proactively providing policy data and policy dependencies to the second access point to minimize latency of processing of access requests generated by the user.

21 Claims, 6 Drawing Sheets

POLICY-BASED PROCESSING OF AUTHENTICATION REQUESTS USING LOCATION DATA FOR CLOUD-HOSTED SYSTEMS AND APPLICATIONS

TECHNICAL FIELD

At least one embodiment pertains to processing resources that are used to evaluate authentication requests by a cloud access service. For example, at least one embodiment pertains to decreasing latency during evaluation of authentication requests generated to process accesses of a moving user to resources provided by a cloud service.

BACKGROUND

Various cloud-based services (e.g., gaming services, streaming services, database services, etc.) use authentication measures for users (e.g., subscribers to the services) when the users log in to the services and request access to specific resources, such as a movie, a video game, an online version of a magazine, and the like. Modern cloud services often offload processing of such authentication requests to specialized cloud-based access servers. A typical user request from a user trying to access a particular resource causes the cloud-based service to generate an authentication request and forward the authentication request to the specialized access server. The access server can fetch various data pertinent to the authentication request and determine whether the authentication request is to be granted or denied, and communicate the determination to the cloud-based services. The cloud-based services, having received the determination, can allow the user access to the requested resource, deny access to the resource, offer the user an expanded subscription plan that includes access to the requested resource, or to take any other suitable action.

DETAILED DESCRIPTION

Figure 1A:
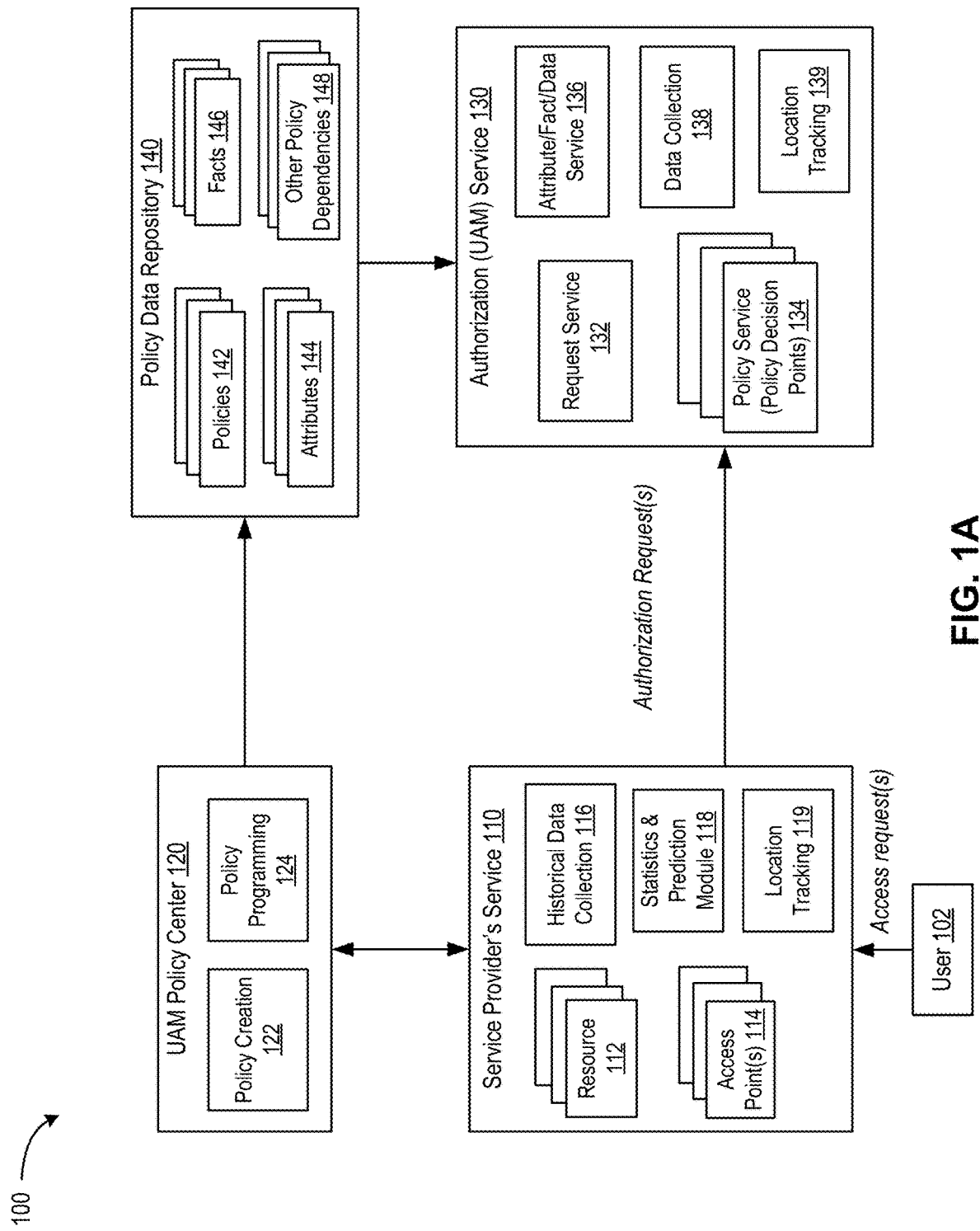
FIG. 1A is a block diagram of an example cloud architecture capable of efficient processing of authorization requests generated in the course of interactions of a moving user with cloud-based services, according to at least one embodiment.

Cloud-based access servers, such as Unified Access Management (UAM) servers, often have to contemporaneously process a large number of authentication requests. In some applications, almost every access attempt or an action by a user can result in an authentication request being sent to the UAM server. Authorization requests can be processed using various methods of access control, such as row and column access control (RCAC), role-based access control (RBAC), attribute-based access control (ABAC), and so on. For example, an RCAC system can store access policies in the form of access tables with various rows (and/or columns) specifying access rights of users to various information referenced in these rows (and/or columns), e.g., access rights of different staff members of a hospital to multiple categories of patient data. An RBAC system can define various user attributes, such as job titles, seniority level, security clearances, locations where access requests originate, and so on. The ABAC infrastructure greatly expands the available attribute space to a practically unlimited space of fixed or changeable information. Any number of policies can be defined that control access to various resources of a cloud-based Service Provider (e.g., streaming service, a gaming service, a hospital network, a database subscription service, and so on). A Service Provider or an UAM server can maintain a library of policies that establish access rights for various applications and resources provided by Service Provider. Each policy may be conditioned on any number of facts (e.g., any static data about services offered by a Service Provider, network environment, governmental regulations, etc.) and any other number of data dependencies (e.g., specific subscription plans, security requirements, time of day, day of week, and so on). Any of the data dependencies can be used as policy attributes when handling user access requests and requests for actions, e.g., a request by a user to watch a movie, play a video game, perform a search in a confidential database, and so on.

Attributes can be any characteristics or values associated with a user request. ABAC analyzes the attributes associated with the user request in view of various rules established by the relevant policies. The rules/policies define which attributes or combinations of attributes are required for the user to be granted access to a requested resource (e.g., a movie or an address of a patient) or to successfully perform an action (e.g., add a database entry). For example, attributes can include a current subscription plan of the user, a job title of the user, a business unit of the user, a type of the action attempted (download, view, read, write, execute, etc.), day of the week, time of day, or any other static or dynamic information.

UAM policies can be represented by computer codes in Rego language, which is a language supported by Open Policy Agent, or any other suitable language. A policy can involve any number of attributes, facts, or any other data dependencies, which are often represented using JavaScript Object Notation (JSON) format (e.g., <key, value> pairs).

When a user requests an access to some Service Provider's resources, the Service Provider forwards an authorization request to the UAM server asking the UAM server to evaluate whether to authorize or deny the user's request. A specific request can invoke one or multiple policies, each policy associated with its relevant dependencies. To perform authorization, the UAM server may download a certain amount of data dependencies (e.g., policies/facts/attributes/ etc.) within a relatively short time, and preferably without much latency. A perceptible latency diminishes the user's satisfaction and may even cause the user to drop the Service Provider's services. Presently, cloud services support a large and increasing number of moving users, e.g., passengers and/or computing devices of cars, trains, buses, or other moving objects. A moving user can be supported by a network of the Service Provider's access points, which may be associated with (and supported by) wireless access nodes (cell towers), Internet Service Provider (ISP) nodes, and other systems. An access point can receive an access request produced by the user's device(s), generate an authorization request, and send the authorization request to a UAM policy decision point that serves the particular Service Provider's access point. The UAM policy decision point can download relevant policies (e.g., from a UAM controller of the UAM service) for evaluating various authorization requests generated by the Service Provider's access point in response to the user's activity. After the user moves to a different area serviced by a different Service Provider's access point and a different UAM policy decision point, this new UAM policy decision point needs to obtain the relevant policies from the UAM controller before user's activity can be supported. This may significantly increase the latency of handling authorization requests while the user is moving between different areas, which can lead to disruptions of the user's service and/or activities.

Aspects and embodiments of the present disclosure address these and other technological challenges by disclosing methods and systems that decrease latency of cloud-based authentication services that support moving users. More specifically, the embodiments disclosed herein advantageously use location data (e.g., global positioning data) indicating a current location of the user, estimating the trajectory of a user's motion (e.g., along a highway or a rail track), and predicting the time when the user is likely to transition between areas serviced by different access points. Based on such predictions, the UAM controller may provide relevant policies and policy dependencies before the user moves to a different area, so that the transition between the areas may occur smoothly with no interruption of the processing of authorization requests. In some embodiments, the new policy decision points may be equipped with policies and policy data related to resources not yet accessed by the user. For example, historical patterns of requests made by user may be determined by analyzing statistics of accesses generated by the users over a certain time horizon and may include the statistics of resources accessed (e.g., sitcoms, TV series/shows, video games, etc.), duration of user interactions with Service Provider's services, times of interaction, order in which various resources are accessed, as well as historical patterns of the user's motion (over a certain path, e.g., to and from work), and so on.

In some embodiments, for example and without limitation, policy decision points may be bundled and provided directly to a Service Provider's access points as part of a container image, which may include a processing snapshot with one or more executable files, libraries, and other resources implementing relevant policies. Prior to the user moving to a different area, a new container image may be provided to the next access point of the Service Provider along the user's trajectory. More specifically, based on the historical data, the UAM controller may be aware of specific resources that the user is likely to request within a certain time horizon and may determine the content of specific container images (and at what times) to be provided along the user's trajectory. In some embodiments, a new container image may be generated and provided to a new access point of the Service Provider when the user enters an area of overlapping coverage of two access points.

The advantages of the disclosed techniques include (but are not limited to) reducing latency in handling of authorization requests generated to support accesses of cloud resources by moving users. This improves user satisfaction and efficiency of a Service Provider's cloud-based services and further enables the UAM servers to support multiple Service Providers and enables a Service Provider to support multiple users (subscribers).

The systems and methods described herein may be used for a variety of purposes, by way of example and without limitation, for machine control, machine locomotion, machine driving, synthetic data generation, model training, perception, augmented reality, virtual reality, mixed reality, robotics, security and surveillance, simulation and digital twinning, autonomous or semi-autonomous machine applications, deep learning, environment simulation, object or actor simulation and/or digital twinning, data center processing, conversational AI, light transport simulation (e.g., ray-tracing, path tracing, etc.), collaborative content creation for 3D assets, cloud computing and/or any other suitable applications.

Disclosed embodiments may be comprised in a variety of different systems such as automotive systems (e.g., a control system for an autonomous or semi-autonomous machine, a perception system for an autonomous or semi-autonomous machine), systems implemented using a robot, aerial systems, medial systems, boating systems, smart area monitoring systems, systems for performing deep learning operations, systems for performing simulation operations, systems for performing digital twin operations, systems implemented using an edge device, systems incorporating one or more virtual machines (VMs), systems for performing synthetic data generation operations, systems implemented at least partially in a data center, systems for performing conversational AI operations, systems for performing light transport simulation, systems for performing collaborative content creation for 3D assets, systems implemented at least partially using cloud computing resources, and/or other types of systems.

System Architecture

FIG. 1A is a block diagram of an example cloud architecture 100 capable of efficient processing of authorization requests generated in the course of interactions of a moving user with cloud-based services, according to at least one embodiment. As depicted in FIG. 1, cloud architecture 100 may support operations of a Service Provider's service 110 that provides cloud-based Service Provider's resources to one or more users by handling authorization requests on an authorization service 130, which may be an UAM service. Various devices and components of cloud architecture 100 may be connected to a network (not shown), which may be a public network (e.g., the Internet), a private network (e.g., a local area network (LAN), or wide area network (WAN)), a wireless network, a personal area network (PAN), or a combination thereof.

Service Provider's service 110 may include any number of servers and/or other computing devices that collectively provide an access of a user 102 to any number of cloud-based resources 112. Similarly, authorization service 130 may be implemented using any number of servers and/or other computing devices connected via a public or private network. Each of the servers and/or computing devices that implement Service Provider's service 110 and/or authorization service 130 may include a rackmount server, a workstation, a desktop computer, a laptop computer, a smartphone, a tablet computer, a server, or any suitable computing device capable of performing the techniques described herein. Resources 112 supported and provided (to users 102) by Service Provider's service 110 may include databases, video and/or audio streaming surfaces, video games, online magazines, online libraries, computational software, graphical software, workplace applications, and so on. Users 102 may include individual subscribers to Service Provider's services, group subscribers, organizational subscribers, institutional subscribers, government users and organizations, commercial organizations, educational organizations, and the like. Service Provider's service 110 may deploy one or more user access points 114 configured to facilitate interaction with one or more users 102. Each access point 114 may include any number of hardware devices, such as servers, network controllers, routers, wireless transceivers, modems, antennas, and the like. In some embodiments, access point 114 may be implemented as part of a wireless cell tower, and/or as part of an Internet Service Provider node. Each access point 114 may further include any number of software modules and processes that may support a user interface, which may include a graphical interface (e.g., a screen), and may receive input from any number of input devices (e.g., keyboard, mouse, touchscreen, voice- and motion-activated input devices, and so on) supported by a computing device (desktop computer, workstation, laptop computer, tablet, smartphone, etc.) with which user 102 directly or indirectly interacts. Each access point 114 may support any number of application programming interfaces (APIs) that facilitate user interactions with one or more resources 112. Multiple access points 114 may be joined into a network of access points capable of exchanging information.

Service Provider's service 110 may maintain a historical data collection 116, which may include collection of any information pertinent to access requests to resources 112 from any of the users (or groups of users) of Service Provider's service 110. In particular, historical data collection 116 may include user identifications (IDs), times (starting and ending) of user sessions, specific user inputs, listings of resources 112 accessed (or attempted to be accessed) by the users, policies invoked during authorization and execution of user requests, attributes, facts and other data dependencies accessed or downloaded during authorization of user requests. Data collected in historical data collection 116 may be analyzed by statistics and prediction module 118 that may identify patterns and correlations in previous user accesses by various users 102. Statistics and prediction module 118 may correlate user requests with user IDs, correlate user requests made after user initialization with user requests made later in the user session, and so on. For example, a user of a video streaming service may typically view short videos at the beginning of a user session followed by watching a long movie or an episode of a TV series, and so on. A user may play a video game for a certain time followed by listening to new music releases. An employee of an organization may review emails at the beginning of a workday followed by starting a graphics-editing software to work on a current project.

Access to resources 112 may be controlled by various policies established for Service Provider's services. The policies may be created and maintained by a Service Provider's UAM policy center 120 (for brevity, policy center 120 herein). Policy center 120 may include a policy creation module 122 that may be used, e.g., by developer(s) of Service Provider's services, to establish access rights of users 102 to various resources 112, e.g., multiple levels of access, ranges of accessible data, seniority levels, subscription plans, and the like. Policy creation module 122 may work in conjunction with policy programming 124. Policy programming 124 may integrate policies 142 with any suitable policy-dependent attributes 144, facts 146, and/or any other policy dependencies 148. Policy programming 124 may include a complier that uses any suitable policy programming language, e.g., Rego language or other programming language. Attributes may refer to any information that is subject to at least occasional changes (e.g., user's subscription plan, seniority levels, etc.) while facts may refer to information that is more static (e.g., user's date of birth, education, licensing data, and the like). It should be understood, however, that no bright line test may exist that separates attributes from facts and that what is considered an attribute in some instances may be classified as a fact in other instances, and vice versa.

Policies 142, attributes 144, facts 146, and/or any other policy dependencies 148 may be stored in a policy data repository 140. Policy data repository 140 may be a persistent storage capable of storing any data and metadata that supports provisioning of Service Provider's services. Policy data repository 140 may be hosted by one or more storage devices, such as main memory, magnetic or optical storage based disks, tapes, or hard drives, network-attached storage (NAS), storage area networks (SAN), and so forth. Although depicted as separate from Service Provider's service 110 and authorization service 130, in at least one embodiment policy data repository 140 may be a part of Service Provider's service 110 and authorization service 130. In at least some embodiments, policy data repository 140 may be a network-attached file server, while in other embodiments policy data repository 140 may be some other type of persistent storage such as an object-oriented database, a relational database, and so forth, that may be hosted by a server machine or one or more different machines coupled to Service Provider's service 110 and authorization service 130. Policy data repository 140 may be accessible (e.g., over network or a local connection) to authorization service 130.

Authorization service 130 may include a computing device (or any set of computing devices) dedicated to processing authorization requests generated by a single Service Provider's service 110 or may be a server that supports multiple Service Providers, e.g., video streaming services, audio streaming services, gaming services, online trading services, banking services, online shopping platforms, and the like. Authorization service 130 may process authorization requests generated by Service Provider's service 110 (e.g., by user access point 114 or some other module or component of Service Provider's service 110) in response to user requests. In some embodiments, authorization service 130 may include a request service 132 configured to receive authorization requests and identify one or more policies 142 pertinent to the received requests. Identified policies may be downloaded by policy service 134 that may also identify various relevant policy data. An attribute/fact/data service 136 may then be used to download the relevant policy data from policy data repository 140. Policy service 134 may then evaluate the received authorization request and determine if user's access request is to be allowed, denied, or conditionally approved, e.g., contingent upon user 102 performing some additional action (such as changing a subscription plan, renting a movie, and so on). Policy service 134 may include any number of policy decision points (PDP), which may be processes instantiated to evaluate the received authorization requests. In some embodiments, a single PDP may evaluate authorization requests associated with a single policy. In some embodiments, a single PDP may evaluate authorization requests associated with multiple policies.

A data collection module 138 may keep track of various actions, data downloads, authentication decisions, and the like, and create historical logs that can be transferred to Service Provider's service 110 to be stored in historical data collection 116. In some embodiments, collected historical data may be stored (or duplicated) on authorization service 130. In such embodiments, authorization service 130 may further host statistics and prediction module 118 that performs statistical evaluation of historical data and determines patterns and correlations in previous accesses by various users 102. In some implementations, statistics and prediction modules operating on authorization service 130 and on Service Provider's service 110 may exchange information (e.g., in order to be synchronized).

A location tracking module 139 may perform tracking of location(s) of user(s) 102. For example, access requests made by user(s) 102 may include current coordinates (e.g., of user(s) 102, which in turn may be included in authorization requests generated by access point(s) 114. Coordinates may be determined using a Global Positioning System (GPS), a Global Navigation Satellite System (GNSS), and the like. In some embodiments, coordinates may be determined using triangulation techniques, e.g., based on distances to two or more reference points with known coordinates. Location tracking module 139 may track coordinates of user(s) 102 as a function of time to determine trajectories of user(s) 102. Location tracking module 139 may have access to a map and may correlate the determined trajectories with various transportation paths of the map, e.g., highways, streets, rail tracks, and the like, and may further predict (e.g., by extrapolation) location where user(s) 102 is likely to be after a certain amount of time, e.g., after 5 minutes, 10 minutes, 1 hour, and so on. Based on the predicted locations, location tracking module 139 may identify specific user access point(s) 114 servicing the areas where user(s) 102 is likely to move to in the near future. Although the location tracking operations are described above as being performed by location tracking module 139 operating on authorization service 130, in some embodiments, any, some, or all location tracking operations may be supported by a similar module supported by Service Provider's service 110, e.g., location tracking module 119. In particular, in some embodiments, tracking and predicting trajectories of user(s) 102 may be fully performed by location tracking module 119 of Service Provider's service 110.

Figure 1B:
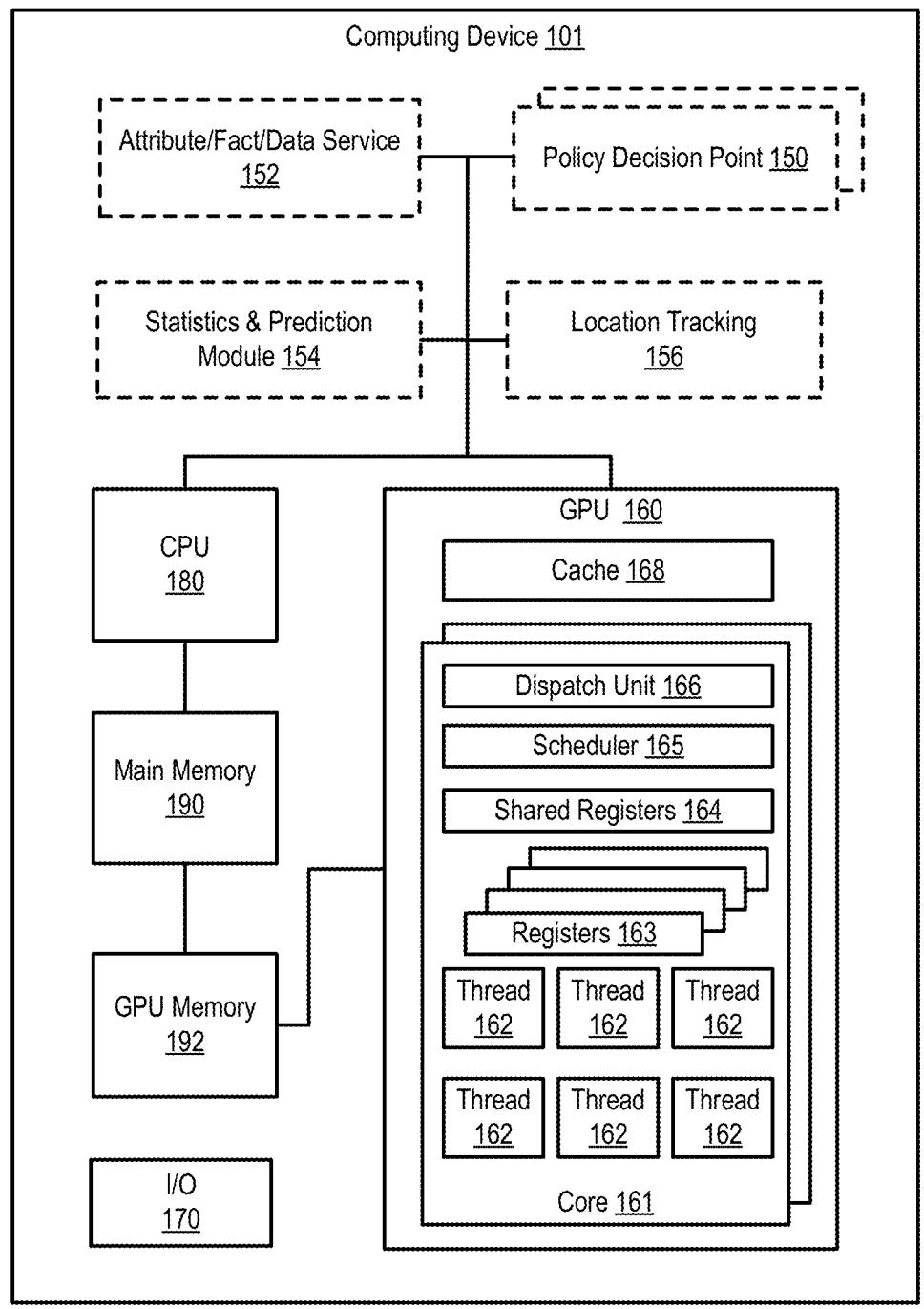
FIG. 1B is an example computing device that may support efficient processing of authorization requests generated in the course of interactions of a moving user with cloud-based services, according to at least one embodiment.

FIG. 1B is an example computing device 101 that may support efficient processing of authorization requests generated in the course of interactions of a moving user with cloud-based services, according to at least one embodiment. Example computing device 101 may implement Service Provider's service 110, Service Provider's UAM policy center 120, authorization service 130, policy repository 140, or any other service described in the instant disclosure. Computing device 101 may support any, some, or all of the engines and services described in conjunction with FIG. 1A above and/or FIGS. 2-3 below. For example, computing device 101 may support one or more policy decision points 150, attribute/fact/data service 152, statistics and prediction module 154, location tracking module 156, and other modules, engines, and components referenced in conjunction with FIGS. 2-3. It should be understood (as illustrated schematically with dashed boxed) that only some of the modules, engines, services, and/or components may be supported by a particular computing device 101 with other components supported by different computing devices. Various modules, engines, services, and components supported by computing device 101 may be executed by one or more GPUs 160. In at least one embodiment, a GPU 160 includes multiple cores 161, each core being capable of executing multiple threads 162. Each core may run multiple threads 162 concurrently (e.g., in parallel). In at least one embodiment, threads 162 may have access to registers 163. Registers 163 may be thread-specific registers with access to a register restricted to a respective thread. Additionally, shared registers 164 may be accessed by multiple threads of the core. In at least one embodiment, each core 161 may include a scheduler 165 to distribute computational tasks and processes among different threads 162 of core 161. A dispatch unit 166 may implement scheduled tasks on appropriate threads using correct private registers 163 and shared registers 164. Computing device 101 may include input/output component(s) 170 to facilitate exchange of information with one or more users or developers.

In at least one embodiment, GPU 160 may have a (high-speed) cache 168, access to which may be shared by multiple cores 161. Furthermore, computing device 101 may include a GPU memory 192 where GPU 160 may store intermediate and/or final results (outputs) of various computations performed by GPU 160. After completion of a particular task, GPU 160 (or CPU 180) may move the output to (main) memory 190. In at least one embodiment, CPU 180 may execute processes that involve serial computational tasks (assigned by policy decision points 150) whereas GPU 160 may execute tasks (such as collection of statistics by statistics and prediction module 154) that are amenable to parallel processing. In at least one embodiment, policy decision points 150 and/or location tracking module 156 may determine which processes are to be executed on GPU 160 and which processes are to be executed on CPU 180. In other embodiments, CPU 180 may determine which processes are to be executed on GPU 160 and which processes are to be executed on CPU 180.

Location-Aware Processing of Access Requests

Figure 2:
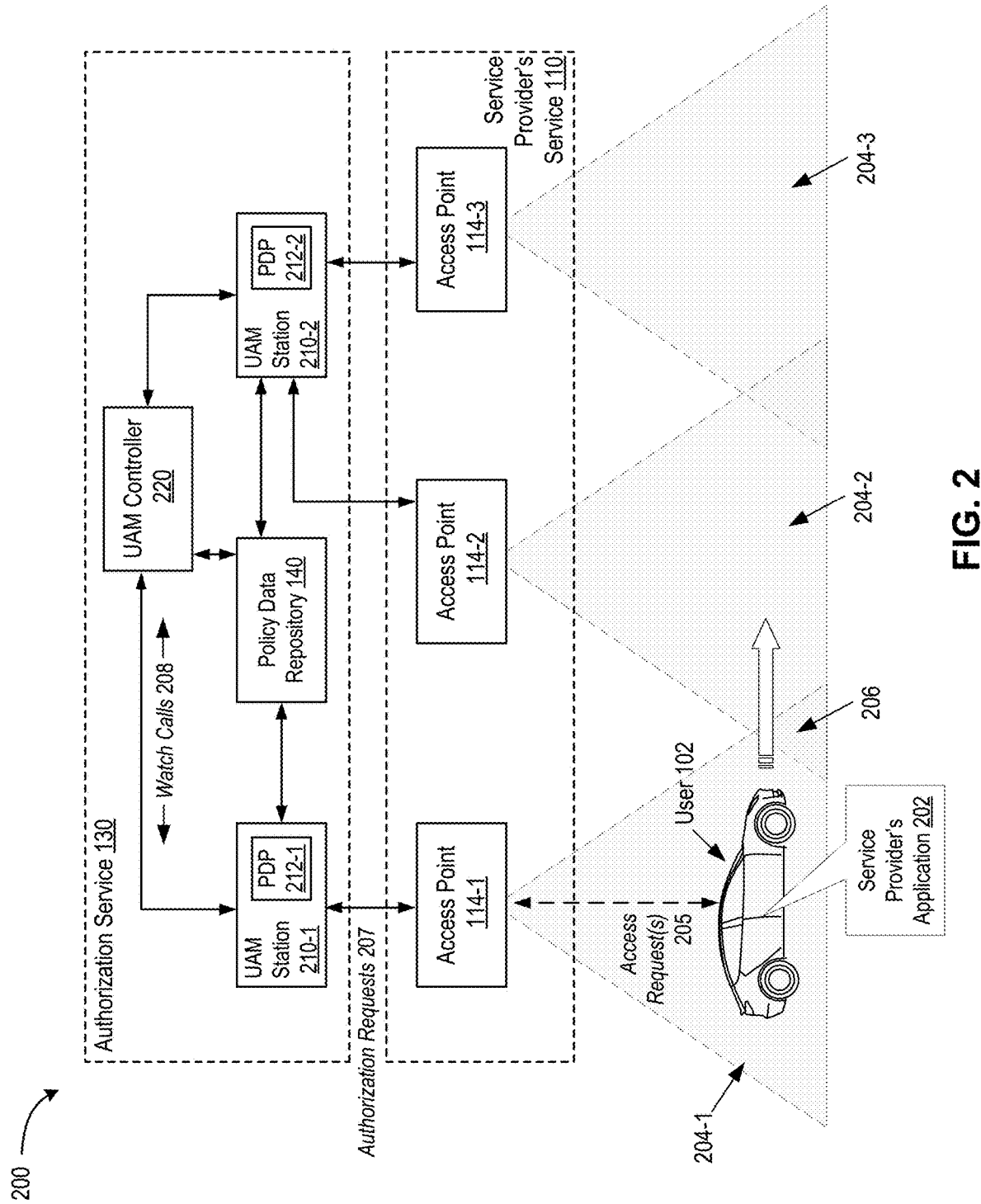
FIG. 2 is a block diagram illustrating an example system that supports location-informed processing of requests from a moving user to access resources of a cloud-based service, in accordance with at least some embodiments.

FIG. 2 is a block diagram illustrating an example system 200 that supports location-informed processing of requests from a moving user to access resources of a cloud-based service, in accordance with at least some embodiments. As shown in FIG. 2, a moving user 102 may be a passenger of a car, bus, subway train, commuter train, a long-distance train, or any other means of transportation, including planes, ships, walkways, and so on. User 102 may be accessing any number of resources of Service Provider's service 110 (e.g., cloud-based service) via Service Provider's application 202 operating on one or more user's devices (e.g., laptop or desktop computers, tablets, smartphones, smart watches, and so on). Service Provider's application 202 may be a dedicated application installed on the user's device(s) or a general-purpose web-browser accessing Service Provider's resources. The resources accessed may include (but need not be limited to) a work email, a computational software, a video game, a movie, an audio stream, a database, a brokerage service, or any other digital resource. In some embodiments, user 102 may be a device, a process, or another non-living entity, e.g., an equipment mounted on a moving platform, such as a navigation equipment, a meteorological equipment, a security equipment, a safety monitoring equipment, and so on.

As depicted in FIG. 2, Service Provider's service 110 may deploy multiple access points 114-1, 114-2, 114-3 . . . that may receive user 102 inputs and determine that the received inputs request an access to one or more resources provided by Service Provider's service 110, such as a data file, a media file, an executable file, a database entry, a library file, a search engine, and the like. Each access point 114-n may be servicing a specific geographic area 204-n and serving as a gateway to Service Provider's services 110 for various users located in the respective geographic area 204-n. For example, user 102 may be currently (as shown) serviced by access point 114-1. Access point 114-n may receive an access request 205 (or multiple access requests 205) from user 102 and may generate one or more authorization requests 207 to authorization service 130 to evaluate accessibility of the requested resources to user 102. In some embodiments, authorization requests 207 may be sent to a specific station (server) of authorization service 130, denoted herein as a UAM station 210-n. In some instances, a UAM station 210-n may serve a single access point, e.g., UAM station 210-1 may serve access point 114-1. In some instances, a UAM station 210-n may serve multiple access points, e.g., UAM station 210-2 may serve access point 114-2 and access point 114-3.

Authorization service 130 may include a controller server, e.g., a UAM controller 220. UAM controller 220 may coordinate policy placement on various UAM stations 210-n. For example, when access point 114-1 sends a first authorization request associated with user 102 to UAM station 210-1, UAM station 210-1 may determine which specific policies control evaluation of the first authorization request and retrieve those policies from UAM controller 220 (or a policy data repository 140 in FIG. 1A or as otherwise directed by UAM controller 220). Additionally, UAM controller 220 may receive, from UAM station 210-1, the identity of user 102 and access a stored profile of user 102. The user profile may delineate the scope of the user's access rights to various resources of Service Provider's service 110, e.g., the user's subscription plan, job title, security level, and the like. The user profile may also include listings of resources frequently accessed by the user, which may be based on historical data. Based on the retrieved information, UAM controller 220 may provide, to UAM station 210-1, various policies and policy data including but not limited to policy dependencies, policy facts, policy attributes, and the like. In particular, UAM controller 220 may retrieve from policy data repository 140 and provide, to UAM station 210-1, policies and policy dependencies associated with the first authorization request or any other authorization requests already received by UAM station 210-1. Additionally, UAM controller 220 may proactively provide policies and policy dependencies for processing authorization requests that are likely, in view of the historical data, to arise during the current user session.

Having received the policy data, UAM station 210-1 may establish one or more policy decision points (PDPs) 212-1 for processing of authorization requests originating from access point 114-1 in relation to user 102 activity. The established PDP 212-1 may be used to process authorization requests not only related to user 102 but also to any other users supported by access point 114-1 and accessing similar resources. In some instances, at least some of policies related to evaluating user 102 accesses may be already present on UAM station 210-1 (e.g., from processing earlier authorization requests related to other users' activities). Similar operations may be performed by other UAM stations 210-n, e.g., UAM station 210-2 servicing (using PDP 212-2) access points 114-2 and 114-3 (which support users located in areas 204-2 and 204-3, respectively).

UAM station 210-1 may update PDP 212-1 as the need arises, e.g., when user 102 makes an access request 205 that is outside the scope of the policies currently handled by PDP 212-1. For example, user 102 may attempt to access a database that user 102 (or other current users of access point 114-1) has not accessed earlier in the current session or even in any of the previous sessions with Service Provider's service 110, and which statistics and prediction module 118 of FIG. 1A is unable to predict, based on historical data of the past accesses, that user 102 would attempt to access. UAM station 210-1 may then seek and obtain, from UAM controller 220, additional policies (and policy dependencies) specifying how accesses to the database should be handled. Upon receiving these policies, UAM station 210-1 may update the existing PDP(s) 212-1 or establish another PDP on UAM station 210-1 to handle accesses of user 102 (and other users) to the database.

UAM station 210-1 may monitor a changing location of user 102. For example, access requests 205 transmitted by user 102 (or user's device(s)) to access point 114-1 may include location data for user 102. The location data may be in any form that identifies proximity of user 102 to various access points 114-n, e.g., coordinates of user 102 (or user's devices), including but not limited to GPS coordinates, distances to any reference locations (e.g., beacon locations), and the like. In turn, access point 114-n may incorporate the received location data into authorization requests 207 sent to UAM station 210-n. UAM station 210-n may exchange watch calls 208 with UAM controller 220. Upstream watch calls 208 may include various requests from UAM stations 210-n to UAM controller 220 (e.g., requests for policies and policy dependencies, as described above). Downstream watch calls 208 may include responses from UAM controller 220 to UAM stations 210-n (e.g., carrying or identifying various policy data), instructions for UAM stations 210-n (e.g., instructions to establish PDP points), and so on. Watch calls 208 may also be used to communicate the location data for user 102 to UAM controller 220.

In some embodiments, access point 114-1, UAM station 210-1, and/or UAM controller 220 may track the coordinates of user 102 as a function of time and may predict (e.g., using location tracking module 119 of Service Provider's service 110 or location tracking module 139 of authorization service, as illustrated in FIG. 1A) that user 102 is to leave coverage area 204-1 associated with access point 114-1 and enter coverage area 204-2 associated with access point 114-2 within a certain time, e.g., 5 minutes, 10 minutes, and so on. Responsive to this determination, UAM controller 220 may generate a watch call instructing UAM station 210-2 to establish one or more PDPs 212-2 to handle authorization requests associated with user 102 once user 102 leaves coverage area 204-1 and enters coverage area 204-2. In some instances, UAM controller 220 may issue instructions to establish PDP(s) 212-2 responsive to user 102 entering area 206 of the overlapping coverage served by both access point 114-1 and access point 114-2.

In some embodiments, PDPs 212-2 may be the same as (e.g., a copy of) PDPs 212-1 already established on UAM station 210-1. In some embodiments, PDPs 212-2 may be different from PDPs 212-1. For example, UAM controller 220 may be aware that user 102 has already accessed email services and newspaper subscriptions and may also be aware, based on historical data, that user 102 is unlikely to make further accesses to these services. On the other hand, UAM controller 220 may determine, based on historical data, that user 102 is likely to watch a movie (e.g., with 40% probability) or play a video game (with 35% probability). Responsive to this determination, UAM controller 220 may instruct UAM station 210-2 to establish a PDP for handling authorization requests related to movie streaming and another PDP for handling authorization requests related to streaming output of cloud-hosted software applications (and may provide the respective policies and policy data to UAM station 210-2), but may not instruct UAM station 210-2 to establish PDPs for handling email or subscription authorization requests.

As a result, prior to user 102 entering coverage area 204-2, UAM station 210-2 may be fully configured to handle authorization requests that access point 114-2 is likely to generate to support user 102 activity while user 102 remains in coverage are 204-2. This ensures uninterrupted access of user 102 to resources of Service Provider's service 110 and reduced latency during crossing between different coverage areas 204-*n*.

Figure 3:
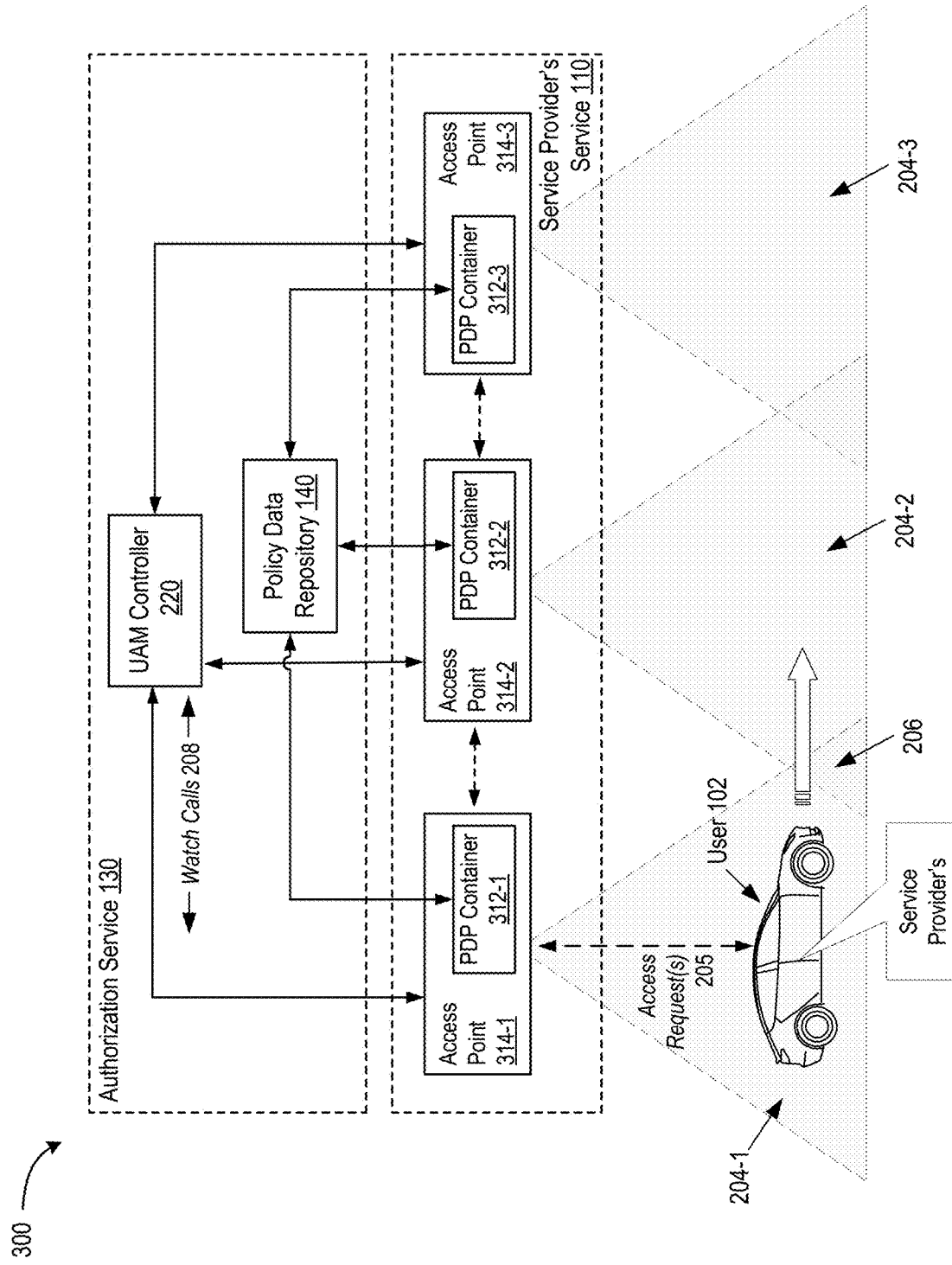
FIG. 3 is a block diagram illustrating another example system that supports container-supported processing of requests from a moving user to access resources of a cloud-based service, in accordance with at least some embodiments.

FIG. 3 is a block diagram illustrating another example system 300 that supports container-supported processing of requests from a moving user to access resources of a cloud-based service, in accordance with at least some embodiments. As illustrated in FIG. 3, in some embodiments, the functionality of access points 114-*n* and UAM stations 210-*n* may be combined, so that authorization requests are generated and processed on the Service Provider's side. More specifically, after access point 314-1 receives an access request 205 from user 102 (which may be an initial user authentication or a login access request), access point 314-1 may provide identity of user 102 to UAM controller 220. UAM controller 220 may identify policies that control accesses of user 102 to various resources of Service Provider's service 110. UAM controller 220 may access policy data repository 140 to retrieve the identified policies and various policy dependencies, facts, attributes, etc., and bundle the retrieved policies into a PDP container that is provided to access point 114-1.

The PDP container image may include a processing snapshot capable of self-instantiating on access point 314-1 and executing independent of other processes and environments of access point 314-1. PDP container 312-1 instantiated from the PDP container image may include one or more policies, policy dependencies (facts, attributes, etc.), libraries, configuration files, executable files, and the like. In some embodiments, PDP container 312-1 may be specific to user 102 and may include a processing snapshot stored by authorization service 130 after an earlier session between user 102 and Service Provider's service 110. PDP container 312-1 may include policies and the associated policy data most frequently used by user 102 during a certain predetermined number of user sessions or over a predetermined period of time (e.g., the last week, the last month, etc.). The received PDP container 312-1 may self-execute on access point 314-1 and handle authorization requests generated by access point 314-1 in the same way as the same authorization requests would be handled by PDP 212-*n* instantiated on UAM station 210-*n* in the embodiment illustrated in FIG. 2.

In some embodiments, initial PDP container 312-1 provided to access point 114-1 by UAM controller 220 may include policies and policy data associated with a specific class of resources requested by user 102 in a first access request (or a first group of access requests). In some embodiments, initial PDP container 320-1 may include multiple policies and policy data, including policies that have not been implicated in the first access request (or the first group of access requests). For example, initial PDP container 312-1 may include all policies related to access requests to resources that are within the scope of the user's subscription or a subset of policies that have been implicated in at least a certain percentage (e.g., 50%, 80%, etc.) of previous user sessions. In those instances where user 102 makes an access request that is outside the scope of the policies currently handled by PDP container 312-1, UAM controller 220 may provide additional PDP containers to access point 314-1 or may update the content of the existing PDP container 320-1 with additional policies (and policy dependencies) for handling of new and future authorization requests.

Access point 314-1 may monitor a changing location of user 102, e.g., as described in conjunction with FIG. 2, and may use watch calls 208 to communicate the location data to UAM controller 220. Access point 314-1 or UAM controller 220 may track location (e.g., coordinates) of user 102 as a function of time and may predict (e.g., using location tracking module 119 of FIG. 1A) that user 102 is to leave coverage area 204-1 associated with access point 314-1 and enter coverage area 204-2 associated with access point 314-2 within a certain time. Responsive to this determination, UAM controller 220 may provide a new PDP container image to access point 314-2. Access point 314-2 may use the new PDP container image to instantiate PDP container 312-2. PDP container 312-2 may include various policies and policy data to handle authorization requests associated with user 102 once user 102 leaves coverage area 204-1 and enters coverage area 204-2. In some instances, UAM controller 220 may provide PDP container 312-2 responsive to user 102 entering area 206 of the overlapping coverage served by both access point 314-1 and access point 314-2.

In some embodiments, PDP container 312-2 may be the same as (e.g., a copy of) PDP container 312-1 operating on access point 314-1. In some embodiments, PDP container 312-2 may be different from PDP container 312-1. For example, as described in more detail in conjunction with FIG. 2, UAM controller 220 may determine that within the immediate future (e.g., fifteen minutes, one hour, and so on) user 102 is unlikely to use some of the policies previously handled by PDP container 312-1 but is likely to need additional policies not currently supported by PDP container 312-1. In such situations, UAM controller 220 may provide the PDP container image to instantiate PDP container 312-2 that lacks some of the policies of PDP container 312-1 but includes other policies that were not previously supported by PDP container 312-1.

As user 102 leaves coverage area 204-2 and enters coverage area 204-3, the process of providing a PDP container image and instantiating PDP container 312-3 on access point 314-3 may be performed in a similar fashion. As a result, various access points 314-*n* become equipped to handle access requests from user 102 prior to entering the respective coverage areas 204-*n*. This ensures uninterrupted access of user 102 to resources of Service Provider's service 110 and reduced latency as user 102 transitions between different coverage areas 204-*n*.

Figure 4:
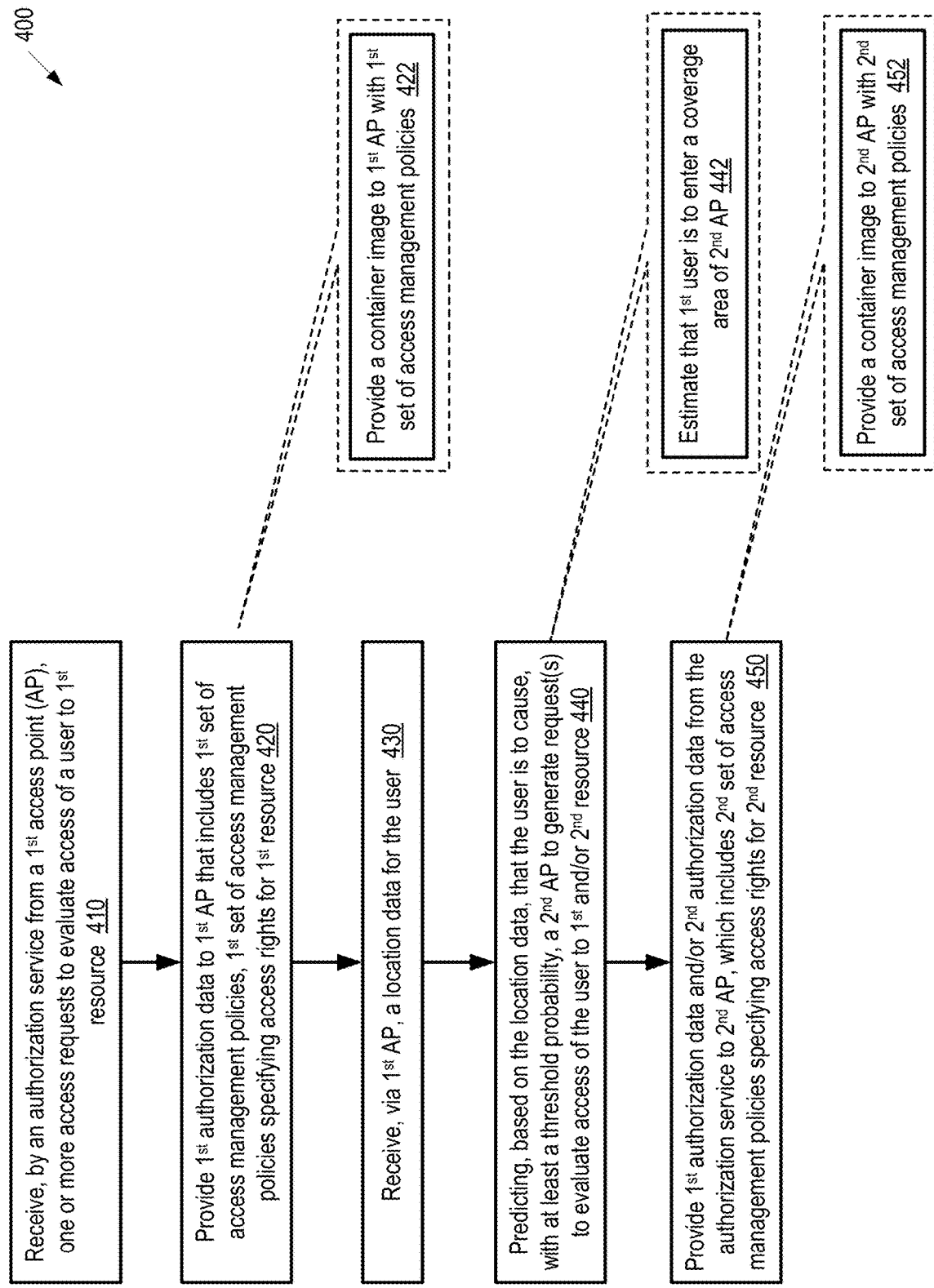
FIG. 4 is a flow diagram of an example method of location-informed processing of requests from a moving user to access resources of a cloud-based service, according to at least one embodiment.

FIG. 4 is a flow diagram of an example method 400 of location-informed processing of requests from a moving user to access resources of a cloud-based service, according to at least one embodiment. Method 400 may be performed by one or more processing units (e.g., CPUs and/or GPUs), which may include (or communicate with) one or more memory devices. In at least one embodiment, method 400 may be performed by processing units of computing device 101 implementing operations of Service Provider's service 110, authorization service 130, UAM controller 220, access points 314-n, and so on. In at least one embodiment, method 400 may be performed by multiple processing threads (e.g., CPU threads and/or GPU threads), each thread executing one or more individual functions, routines, subroutines, or operations of the method. In at least one embodiment, processing threads implementing method 400 may be synchronized (e.g., using semaphores, critical sections, and/or other thread synchronization mechanisms). Alternatively, processing threads implementing method 400 may be executed asynchronously with respect to each other. Various operations of method 400 may be performed in a different order compared with the order shown in FIG. 4. Some operations of method 400 may be performed concurrently with other operations. In at least one embodiment, one or more operations shown in FIG. 4 may not always be performed.

Method 400 may be performed in the context of provisioning of streaming services, gaming services, databases services, online library services, cloud-based computing services, and many other contexts. A cloud-based service may provide any number of resources. A resource may be any video file, audio file, database or a database entry, an online magazine or an article in an online magazine, any computer program running on a cloud, and so on. The cloud-based Service Provider's service may include multiple access points (e.g., access points 114-n in FIG. 2 and/or access points 314-n in FIG. 3). In some embodiments, each or at least some of the access points may be associated with a wireless service node or an Internet service provider node.

At block 410, processing units performing method 400 may receive one or more authorization requests (e.g., authorization requests 207 in FIG. 2). The one or more authorization requests may be received by processing units of an authorization service (e.g., authorization service 130 in FIG. 2) from a first access point (e.g., access point 114-1 in FIG. 2), which may provide authorization support services to multiple users. The one or more authorization requests may be to evaluate access of a user to a first resource and may be generated in response to the access point receiving an access request, or multiple access requests, from the user (e.g., access request(s) 205 received from user 102 in FIG. 2).

At block 420, method 400 may continue with providing, by the authorization service, a first authorization data to the first AP. The first authorization data may include a first set of access management policies that specify access rights for the first resource. The first authorization request may be an authorization request 207 in FIG. 2. The first authorization data may be a request to evaluate accessibility of the first resource to the user. It should be understood that the terms first, second, etc., are used herein as identifiers and do not presuppose any temporal or logical order. In particular, "first authorization data" may but need not be the first (chronologically) authorization data provided by the authorization server during a specific user session. In some instances, the first authorization data may be (or may include) used to evaluate a request to authenticate the user (e.g., a request to start a new user session on Service Provider's service 110 in FIG. 2). In some embodiments, as indicated by the top callout portion of FIG. 4, providing the first authorization data to the first AP may include, at block 422, providing a container image to the first AP point (e.g., from the authorization services). The container image may include the first set of access management policies. In some embodiments, the container image may include a processing snapshot generated by or stored on the authorization service. The processing snapshot may include one or more policy codes implementing a respective policy that specifies access rights for at least one resource of a plurality of resources supported by a cloud service. In some embodiments, the container image may include access management policies and policy data used to evaluate requests to frequently accessed, by the user, resources of the Service Provider's cloud service.

At block 430, method 400 may continue with the processing units receiving, via the first AP, a location data for the user. The location data may be or include a GPS data, a GNSS data, a set of coordinates for any suitable system of coordinates, a set of distances of one or more reference points. In some embodiments, the location data may include only a single coordinate, e.g., a distance along a highway or a railway track.

At block 440, method 400 may continue with the processing units predicting, based on the location data, that the user is to cause, with at least a threshold probability, a second AP to generate one or more access requests to evaluate access of the user to at least one of the first resource or a second resource. In particular, the location data may include a location of the user at each of a plurality of times, e.g., a trajectory of the user. In some embodiments, as illustrated with the middle callout portion in FIG. 4, predicting that the second AP is to generate one or more access requests to evaluate access of the user to at least one of the first resource or the second resource may include, at block 442 estimating that the user is to enter a coverage area of the second AP. In particular, the authorization service may determine that the trajectory of the user is such that the user is to leave an area served by the first AP and enter an area served by the second AP. In some embodiments, providing the first authorization data or the second authorization data may be performed prior to the user entering the coverage area of the second AP. In some embodiments, providing the first authorization data or the second authorization data is performed responsive to the user entering an area of an overlapping coverage by the first AP and the second AP (e.g., area 206 in FIG. 2).

In some embodiments, the second resource may include at least one of a gaming application, a video streaming application, an audio streaming application, or a database application. In some embodiments, the second resource may be supported by the same cloud service that supports the first resource. In some embodiments, the second resource may be supported by a cloud service that is different from the cloud service that supports the first resource. For example, the first resource may be supported by a movie streaming service while the second resource may be supported by a gaming service. In some embodiments, the second set of access management policies may include access management policies specifying access of the user to one or more resources that have not been accessed by the user during a current user session. In particular, predicting that the second AP is to generate one or more access requests to the second resource may be based on a historical data that includes statistical correlations between the user accessing the first resource and accessing the second resource.

At block 450, method 400 may continue with providing at least one of the first authorization data or a second authorization data from the authorization service to the second AP. The second authorization data may include a second set of access management policies specifying access rights for the second resource. In some embodiments, as indicated by the bottom callout portion of FIG. 4, providing at least one of the first authorization data or a second authorization data to the second AP may include, at block 422, providing a container image. The container image may include at least one of the first set of access management policies or the second set of access management policies. In some embodiments, the container image may include a processing snapshot received by the authorization service from the first AP. The processing snapshot may include one or more policy codes implementing a respective policy that specifies access rights for at least one resource of a plurality of resources supported by a cloud service. In some embodiments, the container image may include access management policies and policy data used to evaluate requests to frequently accessed, by the user, resources of the Service Provider's cloud service.

Figure 5:
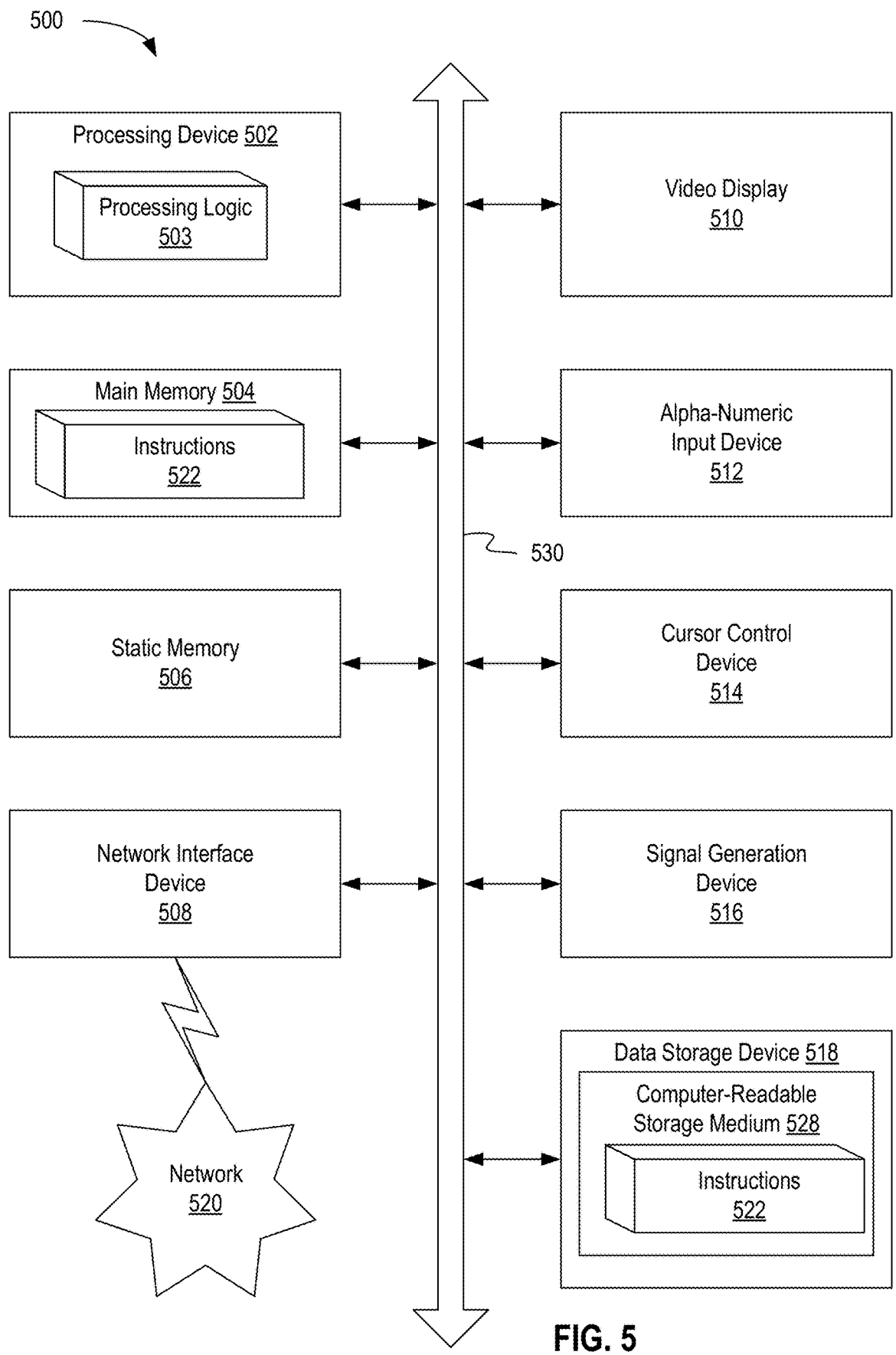
FIG. 5 depicts a block diagram of an example computer device capable of enabling efficient location-informed processing of requests from a moving user to access resources of a cloud-based service, in accordance with at least some embodiments of the present disclosure.

FIG. 5 depicts a block diagram of an example computer device 500 capable of enabling efficient location-informed processing of requests from a moving user to access resources of a cloud-based service, in accordance with at least some embodiments of the present disclosure. Example computer device 500 can be connected to other computer devices in a LAN, an intranet, an extranet, and/or the Internet. Computer device 500 can operate in the capacity of a server in a client-server network environment. Computer device 500 can be a personal computer (PC), a set-top box (STB), a server, a network router, switch or bridge, or any device capable of executing a set of instructions (sequential or otherwise) that specify actions to be taken by that device. Further, while only a single example computer device is illustrated, the term "computer" shall also be taken to include any collection of computers that individually or jointly execute a set (or multiple sets) of instructions to perform any one or more of the methods discussed herein.

Example computer device 500 can include a processing device 502 (also referred to as a processor or CPU), a main memory 504 (e.g., read-only memory (ROM), flash memory, dynamic random access memory (DRAM) such as synchronous DRAM (SDRAM), etc.), a static memory 506 (e.g., flash memory, static random access memory (SRAM), etc.), and a secondary memory (e.g., a data storage device 518), which can communicate with each other via a bus 530.

Processing device 502 (which can include processing logic 503) represents one or more general-purpose processing devices such as a microprocessor, central processing unit, or the like. More particularly, processing device 502 can be a complex instruction set computing (CISC) microprocessor, reduced instruction set computing (RISC) microprocessor, very long instruction word (VLIW) microprocessor, processor implementing other instruction sets, or processors implementing a combination of instruction sets. Processing device 502 can also be one or more special-purpose processing devices such as an application specific integrated circuit (ASIC), a field programmable gate array (FPGA), a digital signal processor (DSP), network processor, or the like. In accordance with one or more aspects of the present disclosure, processing device 502 can be configured to execute instructions performing method 400 of location-informed processing of requests from a moving user to access resources of a cloud-based service.

Example computer device 500 can further comprise a network interface device 508, which can be communicatively coupled to a network 520. Example computer device 500 can further comprise a video display 510 (e.g., a liquid crystal display (LCD), a touch screen, or a cathode ray tube (CRT)), an alphanumeric input device 512 (e.g., a keyboard), a cursor control device 514 (e.g., a mouse), and an acoustic signal generation device 516 (e.g., a speaker).

Data storage device 518 can include a computer-readable storage medium (or, more specifically, a non-transitory computer-readable storage medium) 528 on which is stored one or more sets of executable instructions 522. In accordance with one or more aspects of the present disclosure, executable instructions 522 can comprise executable instructions performing method 400 of location-informed processing of requests from a moving user to access resources of a cloud-based service.

Executable instructions 522 can also reside, completely or at least partially, within main memory 504 and/or within processing device 502 during execution thereof by example computer device 500, main memory 504 and processing device 502 also constituting computer-readable storage media. Executable instructions 522 can further be transmitted or received over a network via network interface device 508.

While the computer-readable storage medium 528 is shown in FIG. 5 as a single medium, the term "computer-readable storage medium" should be taken to include a single medium or multiple media (e.g., a centralized or distributed database, and/or associated caches and servers) that store the one or more sets of operating instructions. The term "computer-readable storage medium" shall also be taken to include any medium that is capable of storing or encoding a set of instructions for execution by the machine that cause the machine to perform any one or more of the methods described herein. The term "computer-readable storage medium" shall accordingly be taken to include, but not be limited to, solid-state memories, and optical and magnetic media.

Some portions of the detailed descriptions above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise, as apparent from the following discussion, it is appreciated that throughout the description, discussions utilizing terms such as "identifying," "determining," "storing," "adjusting," "causing," "returning," "comparing," "creating," "stopping," "loading," "copying," "throwing," "replacing," "performing," or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Examples of the present disclosure also relate to an apparatus for performing the methods described herein. This apparatus can be specially constructed for the required purposes, or it can be a general purpose computer system selectively programmed by a computer program stored in the computer system. Such a computer program can be stored in a computer readable storage medium, such as, but not limited to, any type of disk including optical disks, CD-ROMs, and magnetic-optical disks, read-only memories (ROMs), random access memories (RAMs), EPROMs, EEPROMs, magnetic disk storage media, optical storage media, flash memory devices, other type of machine-accessible storage media, or any type of media suitable for storing electronic instructions, each coupled to a computer system bus.

The methods and displays presented herein are not inherently related to any particular computer or other apparatus. Various general purpose systems can be used with programs in accordance with the teachings herein, or it may prove convenient to construct a more specialized apparatus to perform the required method steps. The required structure for a variety of these systems will appear as set forth in the description below. In addition, the scope of the present disclosure is not limited to any particular programming language. It will be appreciated that a variety of programming languages can be used to implement the teachings of the present disclosure.

It is to be understood that the above description is intended to be illustrative, and not restrictive. Many other implementation examples will be apparent to those of skill in the art upon reading and understanding the above description. Although the present disclosure describes specific examples, it will be recognized that the systems and methods of the present disclosure are not limited to the examples described herein, but can be practiced with modifications within the scope of the appended claims. Accordingly, the specification and drawings are to be regarded in an illustrative sense rather than a restrictive sense. The scope of the present disclosure should, therefore, be determined with reference to the appended claims, along with the full scope of equivalents to which such claims are entitled.

Other variations are within the spirit of present disclosure. Thus, while disclosed techniques are susceptible to various modifications and alternative constructions, certain illustrated embodiments thereof are shown in drawings and have been described above in detail. It should be understood, however, that there is no intention to limit disclosure to specific form or forms disclosed, but on contrary, intention is to cover all modifications, alternative constructions, and equivalents falling within spirit and scope of disclosure, as defined in appended claims.

Use of terms "a" and "an" and "the" and similar referents in context of describing disclosed embodiments (especially in context of following claims) are to be construed to cover both singular and plural, unless otherwise indicated herein or clearly contradicted by context, and not as a definition of a term. Terms "comprising," "having," "including," and "containing" are to be construed as open-ended terms (meaning "including, but not limited to,") unless otherwise noted. "Connected," when unmodified and referring to physical connections, is to be construed as partly or wholly contained within, attached to, or joined together, even if there is something intervening. Recitation of ranges of values herein are merely intended to serve as a shorthand method of referring individually to each separate value falling within range, unless otherwise indicated herein and each separate value is incorporated into specification as if it were individually recited herein. In at least one embodiment, use of the term "set" (e.g., "a set of items") or "subset" unless otherwise noted or contradicted by context, is to be construed as a nonempty collection comprising one or more members. Further, unless otherwise noted or contradicted by context, the term "subset" of a corresponding set does not necessarily denote a proper subset of corresponding set, but the subset and the corresponding set may be equal.

Conjunctive language, such as phrases of form "at least one of A, B, and C," or "at least one of A, B and C," unless specifically stated otherwise or otherwise clearly contradicted by context, is otherwise understood with context as used in general to present that an item, term, etc., may be either A or B or C, or any nonempty subset of set of A and B and C. For instance, in illustrative example of a set having three members, conjunctive phrases "at least one of A, B, and C" and "at least one of A, B and C" refer to any of following sets: (A), (B), (C), (A, B), (A, C), (B, C), (A, B, C). Thus, such conjunctive language is not generally intended to imply that certain embodiments require at least one of A, at least one of B and at least one of C each to be present. In addition, unless otherwise noted or contradicted by context, the term "plurality" indicates a state of being plural (e.g., "a plurality of items" indicates multiple items). In at least one embodiment, the number of items in a plurality is at least two, but can be more when so indicated either explicitly or by context. Further, unless stated otherwise or otherwise clear from context, the phrase "based on" means "based at least in part on" and not "based solely on."

Operations of processes described herein can be performed in any suitable order unless otherwise indicated herein or otherwise clearly contradicted by context. In at least one embodiment, a process such as those processes described herein (or variations and/or combinations thereof) is performed under control of one or more computer systems configured with executable instructions and is implemented as code (e.g., executable instructions, one or more computer programs or one or more applications) executing collectively on one or more processors, by hardware or combinations thereof. In at least one embodiment, code is stored on a computer-readable storage medium, for example, in the form of a computer program comprising a plurality of instructions executable by one or more processors. In at least one embodiment, a computer-readable storage medium is a non-transitory computer-readable storage medium that excludes transitory signals (e.g., a propagating transient electric or electromagnetic transmission) but includes non-transitory data storage circuitry (e.g., buffers, cache, and queues) within transceivers of transitory signals. In at least one embodiment, code (e.g., executable code or source code) is stored on a set of one or more non-transitory computer-readable storage media having stored thereon executable instructions (or other memory to store executable instructions) that, when executed (i.e., as a result of being executed) by one or more processors of a computer system, cause computer system to perform operations described herein. In at least one embodiment, set of non-transitory computer-readable storage media comprises multiple non-transitory computer-readable storage media and one or more of individual non-transitory storage media of multiple non-transitory computer-readable storage media lack all of code while multiple non-transitory computer-readable storage media collectively store all of code. In at least one embodiment, executable instructions are executed such that different instructions are executed by different processors—for example, a non-transitory computer-readable storage medium store instructions and a main central processing unit ("CPU") executes some of instructions while a graphics processing unit ("GPU") executes other instructions. In at least one embodiment, different components of a computer system have separate processors and different processors execute different subsets of instructions.

Accordingly, in at least one embodiment, computer systems are configured to implement one or more services that singly or collectively perform operations of processes described herein and such computer systems are configured with applicable hardware and/or software that enable performance of operations. Further, a computer system that implements at least one embodiment of present disclosure is a single device and, in another embodiment, is a distributed computer system comprising multiple devices that operate differently such that distributed computer system performs operations described herein and such that a single device does not perform all operations.

Use of any and all examples, or exemplary language (e.g., "such as") provided herein, is intended merely to better illuminate embodiments of disclosure and does not pose a limitation on scope of disclosure unless otherwise claimed. No language in specification should be construed as indicating any non-claimed element as essential to practice of disclosure.

All references, including publications, patent applications, and patents, cited herein are hereby incorporated by reference to the same extent as if each reference were individually and specifically indicated to be incorporated by reference and were set forth in its entirety herein.

In description and claims, terms "coupled" and "connected," along with their derivatives, may be used. It should be understood that these terms may be not intended as synonyms for each other. Rather, in particular examples, "connected" or "coupled" may be used to indicate that two or more elements are in direct or indirect physical or electrical contact with each other. "Coupled" may also mean that two or more elements are not in direct contact with each other, but yet still co-operate or interact with each other.

Unless specifically stated otherwise, it may be appreciated that throughout specification terms such as "processing," "computing," "calculating," "determining," or like, refer to action and/or processes of a computer or computing system, or similar electronic computing device, that manipulate and/or transform data represented as physical, such as electronic, quantities within computing system's registers and/or memories into other data similarly represented as physical quantities within computing system's memories, registers or other such information storage, transmission or display devices.

In a similar manner, the term "processor" may refer to any device or portion of a device that processes electronic data from registers and/or memory and transforms that electronic data into other electronic data that may be stored in registers and/or memory. As non-limiting examples, "processor" may be a CPU or a GPU. A "computing platform" may comprise one or more processors. As used herein, "software" processes may include, for example, software and/or hardware entities that perform work over time, such as tasks, threads, and intelligent agents. Also, each process may refer to multiple processes, for carrying out instructions in sequence or in parallel, continuously or intermittently. In at least one embodiment, terms "system" and "method" are used herein interchangeably insofar as system may embody one or more methods and methods may be considered a system.

In the present document, references may be made to obtaining, acquiring, receiving, or inputting analog or digital data into a subsystem, computer system, or computer-implemented machine. In at least one embodiment, process of obtaining, acquiring, receiving, or inputting analog and digital data can be accomplished in a variety of ways such as by receiving data as a parameter of a function call or a call to an application programming interface. In at least one embodiment, processes of obtaining, acquiring, receiving, or inputting analog or digital data can be accomplished by transferring data via a serial or parallel interface. In at least one embodiment, processes of obtaining, acquiring, receiving, or inputting analog or digital data can be accomplished by transferring data via a computer network from providing entity to acquiring entity. In at least one embodiment, references may also be made to providing, outputting, transmitting, sending, or presenting analog or digital data. In various examples, processes of providing, outputting, transmitting, sending, or presenting analog or digital data can be accomplished by transferring data as an input or output parameter of a function call, a parameter of an application programming interface or interprocess communication mechanism.

Although descriptions herein set forth example embodiments of described techniques, other architectures may be used to implement described functionality, and are intended to be within scope of this disclosure. Furthermore, although specific distributions of responsibilities may be defined above for purposes of description, various functions and responsibilities might be distributed and divided in different ways, depending on circumstances.

Furthermore, although subject matter has been described in language specific to structural features and/or methodological acts, it is to be understood that subject matter claimed in appended claims is not necessarily limited to specific features or acts described. Rather, specific features and acts are disclosed as exemplary forms of implementing the claims.

What is claimed is:

1. A method comprising:
receiving, by an authorization service and from a first access point (AP), one or more authorization requests to evaluate an authorization level for a user to access a first resource;
providing, by the authorization service, first authorization data to the first AP, wherein the first authorization data comprises a first set of access management policies specifying access rights for the first resource;
receiving, using the first AP, location data for the user;
predicting, based at least on the location data and historical data, that the user is to cause, a second AP to generate one or more authorization requests to evaluate the authorization level for the user to access at least one of the first resource or a second resource, wherein the historical data indicates that the user is likely to access the second resource with at least a threshold probability; and
providing, from the authorization service to the second AP, a container image that includes at least one of:
the first authorization data comprising the first set of access management policies,
or
second authorization data comprising a second set of access management policies specifying access rights for the second resource.

2. The method of claim 1, wherein the first resource or the second resource comprises at least one of a gaming application, a video streaming application, an audio streaming application, or a database application.

3. The method of claim 1, wherein the first resource and the second resource are hosted at least partially using a cloud service.

4. The method of claim 1, wherein the authorization service comprises a unified access management (UAM) server, and wherein at least one of the first set of access management policies and the second set of access management policies comprises UAM policies.

5. The method of claim 1, wherein the location data comprises a location of the user at each of a plurality of times, and wherein predicting that the second AP is to generate one or more
authorization requests to evaluate the authorization level for the user to access at least one of the first resource or the second resource comprises estimating that the user is to enter a coverage area corresponding to the second AP.

6. The method of claim 5, wherein providing the first authorization data or the second authorization data is performed prior to the user entering the coverage area corresponding to the second AP.

7. The method of claim 1, wherein providing the first authorization data or the second authorization data is performed responsive to the user entering an area of an overlapping coverage corresponding to the first AP and the second AP.

8. The method of claim 1, wherein the second set of access management policies comprises one or more access management policies specifying access of the user to one or more resources that have not been accessed by the user during a current user session.

9. The method of claim 1, wherein the historical data comprises one or more statistical correlations between the user accessing the first resource and accessing the second resource.

10. The method of claim 1, wherein the container image includes both the first set of access management policies and the second set of access management policies.

11. The method of claim 1, wherein the container image comprises a processing snapshot received by the authorization service from the first AP.

12. The method of claim 11, wherein the processing snapshot comprises one or more policy codes implementing a respective policy that specifies access rights for at least one resource of a
plurality of resources hosted at least partially using a cloud service.

13. The method of claim 1, wherein each of the first AP and the second AP is associated with a wireless service node or an Internet service provider node.

14. A system comprising:
one or more processing devices to:
receive, by an authorization service from a first access point (AP), one or more authorization requests to evaluate an authorization level for a user to access a first resource;
provide, by the authorization service, first authorization data to the first AP, wherein the first authorization data comprises a first set of access management policies specifying access rights for the first resource;
receive, using the first AP, location data for the user;
predict, based at least on the location data and historical data, that the user is to cause a second AP to generate one or more authorization requests to evaluate the authorization level for the user to access at least one of the first resource or a second resource, wherein the historical data indicates that the user is likely to access the second resource with at least a threshold probability; and
provide, from the authorization service to the second AP, a container image that includes at least one of:
the first authorization data comprising the first set of access management policies, or
second authorization data comprising a second set of access management policies specifying access rights for the second resource.

15. The system of claim 14, wherein the first resource or the second resource comprises at least one of a gaming application, a video streaming application, an audio streaming application, or a database application.

16. The system of claim 14, wherein the authorization service comprises a unified access management (UAM) server, and wherein at least one of the first set of access management policies and the second set of access management policies comprises UAM policies.

17. The system of claim 14, wherein the location data comprises a location of the user at each of a plurality of times, and wherein to predict that the second AP is to generate one or more
authorization requests to evaluate the authorization level of the user to access at least one of the first resource or the second resource, the one or more processing devices is to estimate that the user is to enter a coverage area corresponding to the second AP.

18. The system of claim 14, wherein the container image comprises both the first set of access management policies or the second set of access management policies.

19. The system of claim 14, wherein the container image comprises a processing snapshot received by the authorization service from the first AP, the processing snapshot comprising one or more policy codes implementing a respective policy that specifies one or more access rights for at least one resource of a plurality of resources supported by a cloud service.

20. The system of claim 14, wherein the system comprises at least one of: a system for performing simulation operations;
a system for performing digital twin operations;
a system for performing light transport simulation;
a system for performing collaborative content creation for 3D assets; a system for performing deep learning operations;
a system for performing real-time streaming;
a system for generating at least one of virtual reality (VR) content, augmented reality (AR) content, or mixed reality (MR) content;
a system for presenting at least one of VR content, AR content, or MR content; a system implemented using an edge device;
a system implemented using a robot;
a system for performing conversational AI operations; a system for generating synthetic data;
a system incorporating one or more virtual machines (VMs).

21. A processing device comprising:
one or more processing units to:
receive one or more authorization requests to evaluate an authorization level of a user to access a first resource from a first access point (AP);
provide a first set of access management policies specifying access rights for the first resource,
receive location data for the user;
predict, based at least on the location data and historical data, that the user is to cause a second AP to generate one or more access requests to evaluate the authorization level of the user to access at least one of the first resource or a second resource, wherein the historical data indicates that the user is likely to access the second resource with at least a threshold probability; and provide, to the second AP, a container image that includes at least one of:
  the first set of access management policies, or
  a second set of access management policies specifying access rights for the second resource.

* * * * *